United States Patent [19]

Koike

[11] 4,195,544

[45] Apr. 1, 1980

[54] ELECTRONIC MUSICAL INSTRUMENT WITH EXTERNAL SOUND CONTROL FUNCTION

[75] Inventor: Masahiko Koike, Hamamatsu, Japan

[73] Assignee: Nippon Gakki Seizo Kabushiki Kaisha, Namamatsu, Japan

[21] Appl. No.: 888,001

[22] Filed: Mar. 20, 1978

[30] Foreign Application Priority Data

Mar. 25, 1977 [JP] Japan ................................ 52/33034

[51] Int. Cl.[2] ................................ G01H 1/02

[52] U.S. Cl. ................................ 84/1.19; 84/1.24

[58] Field of Search ................ 84/1.11, 1.13, 1.19, 84/1.24, 1.26, 454, DIG. 8, DIG. 18, DIG. 23; 325/348, 403

[56] References Cited

U.S. PATENT DOCUMENTS

| | | | |
|---|---|---|---|
| 3,506,773 | 4/1970 | George | 84/1.21 |
| 3,538,806 | 11/1970 | Bunger | 84/1.21 |
| 3,886,836 | 6/1975 | Hiyoshi | 84/1.26 |
| 3,911,776 | 10/1975 | Beigel | 84/1.24 |
| 3,940,698 | 2/1976 | Itoh | 325/348 |
| 4,019,419 | 4/1977 | Yoshikawa et al. | 84/454 |

*Primary Examiner*—Gene Z. Rubinson
*Assistant Examiner*—Forester W. Isen
*Attorney, Agent, or Firm*—Frishauf, Holtz, Goodman and Woodward

[57] ABSTRACT

A musical sound controlling apparatus preferably incorporated into a music synthesizer type electronic music instrument and capable of generating a musical sound controlling signal in accordance with vocal signals or musical sound signals produced by musical instruments other than the music synthesizer type electronic musical instrument. The apparatus comprises a voltage-controlled filter whose frequency characteristics is controlled in accordance with a control waveform applied thereto and a control waveform generator which produces a control waveform varying with time in response to a trigger signal applied thereto. An external musical sound signal is applied to a switching circuit having a hysteresis characteristic through a rectifier circuit. The switching circuit is arranged to produce a stabilized trigger signal to be applied to the control waveform generator and have first and second different input switching levels for switching the output of the switching circuit. The first input switching level is set higher than the second input switching level. When a rising DC output voltage of the rectifier circuit exceeds the first input switching level the output of switching circuit is switched to produce a trigger signal and when a falling DC output voltage of the rectifier circuit falls below the second input switching level the output of switching circuit is switched back to the original state.

5 Claims, 5 Drawing Figures

ELECTRONIC MUSICAL INSTRUMENT WITH EXTERNAL SOUND CONTROL FUNCTION

BACKGROUND OF THE INVENTION

This invention relates to an external musical sound controlling apparatus suitable for use in combination with an electronic musical instrument and, more particularly, to a musical sound controlling apparatus capable of controlling an external musical sound signal in the same manner as in a music synthesizer type electronic musical instrument.

Music synthesizer type electronic musical instruments presently used include a keyboard section having plural keys and arranged to produce, in response to depression of a key, a pitch determining voltage signal with a magnitude corresponding to the note of the key being depressed and a key depression representing signal or trigger signal; and a musical tone signal synthesizing circuit arrangement having a voltage-controlled oscillator responsive to the pitch determining voltage signal to produce a tone signal corresponding to the depressed key, a voltage-controlled filter coupled to the voltage-controlled oscillator, a voltage-controlled amplifier coupled to the voltage-controlled filter, and control waveform generators responsive to the trigger signal continuing from key depression to key release to produce control waveforms varying with time which are respectively coupled to the voltage-controlled oscillator, voltage-controlled filter and/or voltage-controlled amplifier to control the pitch, tone color and/or volume of a musical tone to be produced in accordance with the respective control waveforms.

It is desired that, to enhance the performance effect of a stage performance, in particular, a music synthesizer type electronic musical instrument have a function to control voices or musical sounds produced by an ordinary musical instrument in the same manner as that in which a tone signal is controlled in the music synthesizer type electronic musical instrument. To this end, it is necessary to produce a signal to trigger a control waveform generator so as to produce a control waveform by detecting the rise and fall of an incoming external musical sound signal. The trigger signal may be produced by rectifying the incoming musical sound signal, smoothing the rectified sound signal by means of a smoothing capacitor and driving a switching circuit by a terminal voltage of the smoothing capacitor. However, where the smoothing capacitor has a large capacitance value, generation of the trigger signal would be inevitably delayed. Where, on the other hand, the smoothing capacitor has a small capacitance value, the terminal voltage of the smoothing capacitor would fluctuate relatively rapidly in accordance with the instantaneous amplitude of the incoming signal with the result that the switching circuit chatters (or operates intermittently) at the rise and fall times of the incoming sound signal.

SUMMARY OF THE INVENTION

It is an object of this invention to provide a musical sound signal controlling apparatus with an improved trigger signal generator for causing a control waveform generator to produce a musical sound signal controlling waveform.

It is another object of this invention to provide a musical generator capable of generating a stabilized trigger signal by an incoming musical sound signal for causing a control waveform generator to generate a musical sound signal controlling waveform.

It is still another object of this invention to provide an electronic musical instrument with an external musical sound signal controlling function.

According to one aspect of the invention, a musical sound signal controlling apparatus which may be preferably incorporated into a music synthesizer type electronic musical instrument comprises external musical sound signal receiving means; rectifier circuit means for rectifying an external musical sound signal from said receiving means and for deriving an amplitude envelope signal from said sound signal; switching circuit means coupled to the rectifier circuit means for producing a trigger signal; a voltage-controlled filter having an input terminal and a control terminal and arranged such that its frequency characteristic is controlled in accordance with a control waveform applied to the control terminal; means for selectively coupling the output of said external musical sound signal receiving means to the input terminal of the voltage-controlled filter; a control waveform generator responsive to a trigger signal to produce the control waveform which is applied to the control terminal of the voltage-controlled filter; and means for coupling the switching circuit means to the control waveform generator.

To produce a stabilized trigger signal from an external musical sound signal the switching circuit is arranged to have first and second different input switching levels for switching the output of the switching circuit, respectively, from a first voltage level to a second voltage level (trigger signal) and from the second voltage level to the first voltage level. The first input switching level is set higher than the second input switching level.

DESCRIPTION OF THE PREFERRED EMBODIMENT

Figure 1:
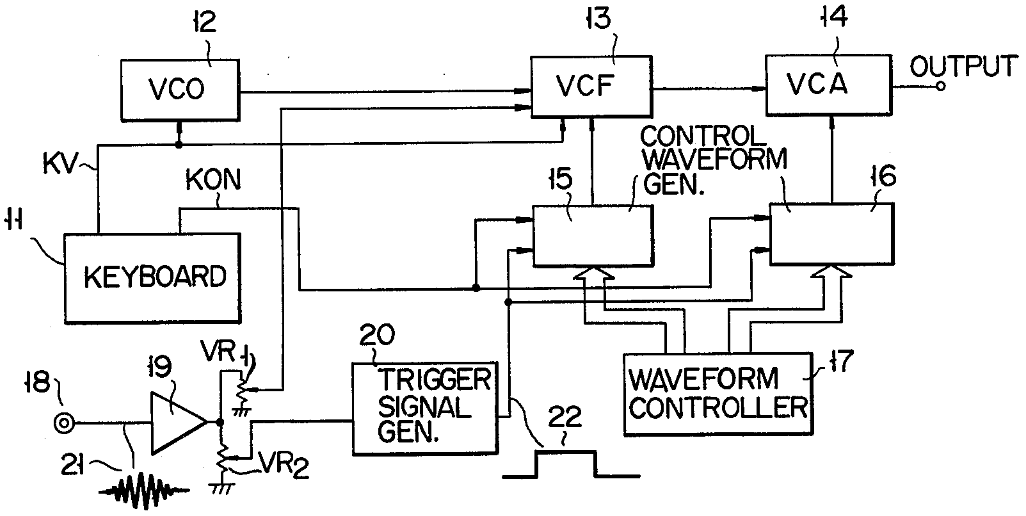
FIG. 1 shows a schematic block diagram of a music synthesizer type electronic musical instrument into which an external musical sound signal controlling apparatus is incorporated in accordance with this invention.

FIG. 1 shows an embodiment of this invention in which a musical sound controlling apparatus is incorporated into a music synthesizer type electronic musical instrument. It should be noted, however, that the musical sound controlling apparatus of this invention need not necessarily be incorporated into an electronic musical instrument. The music synthesizer type electronic musical instrument is well known in the art and therefore it is believed that a detailed description of a construction of the music synthesizer type electronic musical instrument is unnecessary.

In FIG. 1 reference numeral 11 designates a keyboard section having a plurality of keys and arranged to produce, in response to depression of a key, a pitch determining voltage signal KV having a magnitude corresponding to the note of the key being depressed and a key depression representing signal or trigger signal KON which continues from key depression time to key release time. The pitch determining voltage signal KV is applied to a voltage-controlled frequency-variable oscillator 12 (hereinbelow referred to as VCO) to generate therefrom a tone signal having a pitch frequency corresponding to the note of key being depressed. The tone signal generated by VCO 12 is applied to a voltage-controlled filter 13 (hereinbelow referred to as VCF) for coloring the tone signal to produce a musical tone signal. The filtered tone signal from VCF 13 is then supplied to a voltage-controlled amplifier 14 (hereinbelow referred to as VCA) for imparting a desired envelope to the filtered tone signal. The musical tone signal produced as described above is transmitted to a sound system (not shown) to sound a musical tone.

The pitch determining voltage signal KV may be also applied to VCF 13 so that VCF is set to have a cut-off frequency which is proper to the tone signal being produced. The VCF 13 and VCA 14 are controlled by control waveforms from control waveform generators 15 and 16 which are triggered by the key depression representing signal KON from the keyboard section 11 so as to produce the control waveforms varying with time. The control waveform has various controllable parameters such as attack time, attack level, sustain level, first and second decay times. These parameters can be controlled by parameter controlling signals from a waveform controller 17. It is noted that, though not shown in FIG. 1, a control waveform generator for VCO 12 may be provided.

In accordance with this invention, an external musical sound signal receiving terminal 18 is provided which may be connected to a microphone for detecting external voices or musical sounds produced by ordinary musical instruments or to an electrical musical instrument such as an electric guitar. An external musical sound signal 21 received by the terminal 18 is aplified by a buffer amplifier 19 and then applied to the VCF 13 through a potentiometer VR1 having one end connected to the amplifier 19, the other end grounded and a slider tap connected to an input of the VCF 13, to impart a tone color to the incoming musical sound signal. The incoming musical sound signal is also applied through a potentiometer VR2 having one end connected to amplifier 12, the other end grounded and a slider tap connected to an input of a trigger signal generator 20 to the trigger signal generator 20 which forms from the incoming musical sound signal a trigger signal 22 which is applied to the control waveform generators 15 and 16 for triggering.

Figure 2:
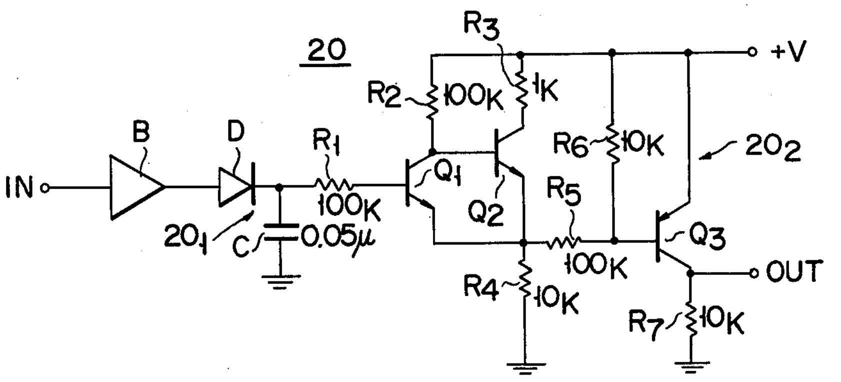
FIG. 2 shows an example of a circuit diagram of the trigger signal generator in FIG. 1.
Figure 3A:
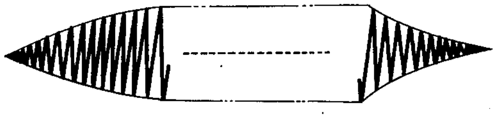
FIGS. 3A to 3C show waveform diagrams useful in explaining the operation of the trigger signal generator in FIG. 2.
Figure 3B:
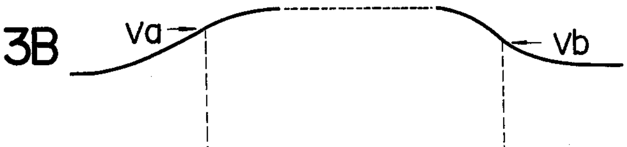

A practical circuit arrangement of the aforesaid trigger signal generator 20 will be described with reference to FIG. 2. An incoming musical sound signal is coupled to an input terminal IN of trigger signal generator 20. The incoming musical sound signal has, as shown in FIG. 3A, a rise time during which the instantaneous amplitude thereof increases with time and a fall time during which the instantaneous amplitude decreases with time like an usual musical sound. The incoming signal is applied through a buffer amplifier B to a rectifier circuit $\mathbf{20}_1$ comprised of a diode D and a smoothing capacitor C which produces a DC voltage signal having a waveshape as shown in FIG. 3B in accordance with the amplitude envelope of incoming musical sound signal shown in FIG. 3A. The output of rectifier circuit $\mathbf{20}_1$ is coupled through a resistor $R_1$ (100 kΩ) to a switching circuit $\mathbf{20}_2$ which has a hysteresis characteristic, that is, first and second different input switching levels $V_a$ and $V_b$ to switch the output of switching circuit 20. More specifically stated, the switching circuit $\mathbf{20}_2$ is arranged such that, upon reaching of the rising output voltage of rectifier circuit $\mathbf{20}_1$ the first input switching level $V_a$, the output of switching circuit $\mathbf{20}_2$ is switched from a first voltage level to a second voltage level and, upon reaching of the falling output voltage of rectifier circuit $\mathbf{20}_1$ the second input switching level $V_b$ lower than the first switching level, the output of switching circuit $\mathbf{20}_2$ is switched from the second voltage level back to the first voltage level. Therefore, even if the rectifier circuit output contains ripple components, the trigger signal delivered from the switching circuit $\mathbf{20}_2$ is not chattered at its rise and fall times.

The switching circuit $\mathbf{20}_2$ is comprised of NPN transistors $Q_1$ and $Q_2$ and a PNP transistor $Q_3$. The transistor $Q_1$ has the base coupled to the rectifier circuit $\mathbf{20}_1$ through the resistor $R_1$, collector coupled through a resistor $R_2$ (100 kΩ) to a +V power supply terminal, and emitter coupled to ground through a resistor $R_4$ (10 kΩ). The transistor $Q_2$ has the base connected to the collector of transistor $Q_1$, emitter connected to the emitter of transistor $Q_1$ and collector connected to the +V power supply terminal through a resistor $R_3$ (1 kΩ). The transistor $Q_3$ has the emitter connected to the +V power supply terminal, base connected to the +V power supply terminal through a resistor $R_6$ (10 kΩ) and to the emitter of transistor $Q_2$ through a resistor $R_5$ (100 kΩ) and collector connected to ground through a resistor $R_7$ (10 kΩ) and to an output terminal of the switching circuit $\mathbf{20}_2$ which is coupled to the control waveform generators 15 and 16. Due to the above-mentioned construction of switching circuit $\mathbf{20}_2$, in the normal state, only the transistor $Q_2$ is rendered conducting and the transistors $Q_1$ and $Q_3$ are rendered nonconducting. Therefore, the output of switching circuit $\mathbf{20}_2$ is normally held at ground potential or the first voltage level.

Figure 3C:
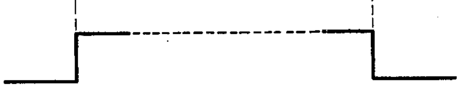

In the presence of an incoming musical sound signal, the DC output voltage of the rectifier circuit $\mathbf{20}_1$ increases with time during the rise time of incoming signal. When the DC output voltage of rectifier circuit $\mathbf{20}_1$ reaches the first input switching level $V_a$ of switching circuit $\mathbf{20}_2$ which is slightly higher than a relatively high emitter potential of transistors $Q_1$ and $Q_2$ in the normal state as determined substantially by the resistors $R_3$ and $R_4$, the transistor $Q_1$ is rendered conducting with the result that the transistor $Q_2$ is rendered nonconducting. Due to the nonconduction of transistor $Q_2$ and conduction of transistor $Q_1$ the emitter potential of transistor $Q_1$ is decreased since the emitter resistor $R_4$ is far smaller in value than the collector resistor $R_2$. The decrease in emitter potential of transistor $Q_1$ results in decrease in the base potential of output transistor $Q_3$ to render the latter conducting. As a result, the output of switching circuit $\mathbf{20}_2$ is switched from ground potential level to the +V potential level or the second voltage level as shown in FIG. 3C. When the transistors $Q_1$ and $Q_3$ are conducting and the transistor $Q_2$ is nonconducting the emitter potential of transistor $Q_1$ is determined by a parallel combination of resistors $R_2$ and $R_5$ and the resistor $R_4$ connected in series with the parallel combination and thus slightly lower than the emitter potential of transistor $Q_1$ in the normal state which is determined by the resistor $R_3$ and $R_4$. It will be evident that so long as the DC output voltage of rectifier circuit $\mathbf{20}_1$ does not fall below the second input switching level $V_b$ which is substantially equal to the emitter potential of transistor $Q_1$ determined by the resistors $R_2$, $R_4$ and $R_5$ as described above, the switching circuit $20_2$ is never switched back. When the DC output voltage of rectifier circuit $20_1$ during the fall time of incoming signal falls below the second input switching level $V_b$ the transistor $Q_1$ is rendered nonconducting and the transistor $Q_2$ is rendered conducting with the result that the transistor $Q_3$ is rendered nonconducting to switch the output of the switching circuit $20_2$ from the second voltage level (+V) back to the first voltage level (ground potential) as shown in FIG. 3C.

The potentiometers VR1 and VR2 shown in FIG. 1 serve to selectively couple the incoming musical sound signal to the VCF 13 and to the trigger signal generator 20 respectively.

Though not shown in FIG. 1, switching means may be provided to selectively couple the tone signal generated by the VCO 12 to the VCF 13 and selectively couple the keyboard section 11 (trigger signal) to the control waveform generators 15 and 16. The source signal to be controlled by the apparatus of the invention is either of or both of the external sound signal and the tone signal from the VCO 12.

What is claimed is:

1. Musical sound controlling apparatus comprising:
musical sound signal receiving means having an output;
circuit means coupled to the output of said receiving means for rectifying a sound signal from said receiving means and for deriving an amplitude envelope signal from said sound signal;
switching circuit means coupled to said circuit means and having an output and first and second different input switching levels, and being responsive to said amplitude envelope signal for switching the output of said switching circuit means, respectively, from a first voltage level to a second voltage level and from the second voltage level to the first voltage level, the first input switching level being higher than the second input switching level;
voltage-controlled filter means having an input terminal, a control terminal and an output, and being arranged such that its frequency characteristic is controlled in accordance with a control waveform applied to said control terminal;
means for selectively coupling the output of said receiving means to said input terminal of said voltage-controlled filter means;
control waveform generation means responsive to the second voltage level of the output of said switching circuit means for producing and coupling a control waveform to said control terminal of said voltage-controlled filter means; and
means for coupling the output of said switching circuit means to said control waveform generation means.

2. Apparatus according to claim 1 further comprising:
voltage-controlled amplifier means having an input terminal coupled to the output of said voltage-controlled filter means, a control terminal and an output, and being arranged such that its gain is controlled in accordance with a control waveform applied to said control terminal thereof;
second control waveform generating means responsive to the second voltage level of the output of said switching circuit means for producing and coupling a control waveform to said control terminal of said voltage-controlled amplifier means; and
means for coupling an output of said switching circuit means to said second control waveform generation means.

3. An electronic musical instrument comprising:
a keyborad section having a plurality of keys and means responsive to depression of a key to produce a pitch determining voltage signal corresponding to the note of the key being depressed and a trigger signal representative of depression of the key;
a musical tone synthesizing circuit arrangement coupled to said keyboard section and including a voltage-controlled oscillator responsive to the pitch determining voltage signal from said keyboard section to produce a tone signal corresponding to the depressed key, a voltage-controlled filter having an input and an output and being arranged such that its frequency characteristic is controlled in accordance with a control waveform applied thereto, a control waveform generator responsive to a trigger signal applied thereto to produce a control waveform which is applied to said voltage-controlled filter, means for coupling the trigger signal from said keyboard section to said control waveform generator, and means for coupling the tone signal from said voltage-controlled oscillator to said voltage-controlled filter;
external musical sound signal receiving means having an output;
circuit means coupled to the output of said receiving means for rectifying an external sound signal from said receiving means and for deriving an amplitude envelope signal from said external sound signal;
switching circuit means coupled to said circuit means for producing another trigger signal and for applying said another trigger signal to said control waveform generator, said switching circuit means having an output and first and second different input switching levels, and being responsive to said amplitude envelope signal for switching the output of said switching circuit means, respectively, from a first voltage level to a second voltage level and from the second voltage level to the first voltage level, the first input switching level being higher than the second input switching level;
means for selectively coupling said external sound signal receiving means to said input of said voltage-controlled filter; and
means for coupling said switching circuit means to said control waveform generator.

4. Apparatus according to claim 3 further comprising:
voltage-controlled amplifier means having an input terminal coupled to the output of said voltage-controlled filter a control terminal and an output, and being arranged such that its gain is controlled in accordance with a control waveform applied to said control terminal thereof;
second control waveform generating means responsive to said another trigger signal for producing and coupling a control waveform to said control terminal of said voltage-controlled amplifier means; and
means for coupling an output of said switching circuit means to said control waveform generation means.

5. Musical sound controlling apparatus comprising:
sound signal receiving means having an output;
circuit means coupled to the output of said receiving means for rectifying a sound signal from said receiving means and for deriving an amplitude envelope signal from said sound signal;

switching circuit means coupled to said circuit means for switching an output of said switching circuit means in response to levels of the rectified sound signal and having first and second different input switching levels for switching said output of said switching circuit means from a first voltage level to a second voltage level and from the second voltage level to the first voltage level, respectively, the first input switching level being higher than the second input switching level;

control waveform generation means responsive to the second voltage level of said output of said switching circuit means for producing a control waveform;

means for coupling said output of said switching circuit means to said control waveform generation means; and means coupled to said control waveform generation means for controlling, in accordance with said control waveform, a musical sound to be sounded.

* * * * *